United States Patent [19]
Hashimoto et al.

[11] Patent Number: 5,772,930
[45] Date of Patent: Jun. 30, 1998

[54] METHOD OF PRODUCING CATHODE MIXTURE FOR BATTERIES

[75] Inventors: Tatsuya Hashimoto, Itami; Fumio Daio, Kitakatsuragi-gun; Kenichi Ohshima, Katano; Akira Iguchi, Neyagawa, all of Japan

[73] Assignee: Matsushita Electric Industrial Co., Ltd., Osaka-Fu, Japan

[21] Appl. No.: 774,166

[22] Filed: Dec. 26, 1996

[30] Foreign Application Priority Data

Dec. 27, 1995 [JP] Japan ................................. 7-340940
Oct. 15, 1996 [JP] Japan ................................. 8-272597
Oct. 15, 1996 [JP] Japan ................................. 8-272598
Oct. 15, 1996 [JP] Japan ................................. 8-272608

[51] Int. Cl.⁶ ............................................. B29B 9/00
[52] U.S. Cl. ........................... 264/15; 264/117; 264/141
[58] Field of Search ......................... 264/15, 117, 140, 264/141

[56] References Cited

U.S. PATENT DOCUMENTS

Re. 27,214  11/1971  Nakahara ................................. 264/15
4,083,810   4/1978   Czerny et al. .
4,808,496   2/1989   Hope et al. .
4,946,359   8/1990   Christen ................................. 264/15

FOREIGN PATENT DOCUMENTS 57-034657  2/1982  Japan .
57-034659  2/1982  Japan .
1 363 414  8/1974  United Kingdom .

*Primary Examiner*—Mary Lynn Theisen
*Attorney, Agent, or Firm*—Panitch Schwarze Jacobs & Nadel, P.C.

[57] ABSTRACT

A method of producing a cathode mixture for batteries is disclosed. It comprises supplying a wet mixture containing a cathode active material, a binding agent and a conductive material onto a disc having a horizontal surface and rotating around its vertical axis, moving the mixture along the upper and side surfaces of the disc to obtain spherical granules. A liquid mixture can also be used.

12 Claims, 11 Drawing Sheets

METHOD OF PRODUCING CATHODE MIXTURE FOR BATTERIES

BACKGROUND OF THE INVENTION

The present invention relates to a method of producing a granular cathode mixture for batteries.

Conventional cathode mixtures for batteries have been produced by using a batch-type kneading granulator. The method is mixing an active material, a binding agent and a conductive material in a predetermined mixture ratio, shearing and kneading the mixture by stirring vanes, and then shaping the mixture into granules by drying. The granular cathode mixture thus produced is pressurized and shaped into pellet-shaped cathodes after being subdivided to heaps by using a measure, that is charging the cathode mixture into a measure having a predetermined volume, and then moving a partitioning rod along the upper fringe of the measure so as to level off the upper surface of the charged cathode mixture and to remove excessive amounts of the charged cathode mixture. These days, with the increasing application of batteries to compact appliances such as electronic calculators and watches, demands for smaller or thinner batteries are getting large. To satisfy the demands, an amount of a cathode mixture in such battery must be small. Therefore, it is required to decrease the unevenness in weight of the cathode. Furthermore, the cathode mixtures are required to have high reaction efficiency and a superior discharge characteristic even at a high load.

To meet these requirements, there is a need for a granular cathode mixture having granule diameters in the range of 40 to 500 $\mu$m and also having a large specific surface area attained by increasing the porosity thereof. However, the granules of the cathode mixture made by the above-mentioned method using the batch-type kneading granulator were large in diameter and also in unevenness in the diameter thereof. Therefore, such cathode mixture had large unevenness in weight of the heap measured by leveling off. Furthermore, the granules of the cathode mixture obtained by being sheared and kneaded with the stirring vanes had a low porosity.

BRIEF SUMMARY OF THE INVENTION

The present invention provides a cathode mixture having small granule diameters, having small unevenness in diameter and facilitating accurate measurement of weight accurately by leveling off with small unevenness. The present invention further provides a cathode mixture having a high porosity and being superior in a discharge characteristic even at a high load.

The method of producing a cathode mixture for batteries in the present invention comprises the steps of:

supplying a wet mixture containing a cathode active material, a binding agent and a conductive material to a screw-inline type granulator comprising a cylinder having a hemispherical die with through holes at the tip surface thereof and an extruding screw disposed in the cylinder, so as to produce granules of the wet mixture by extruding the mixture from the through holes by the rotation of the extruding screw;

Preparing a granule shaping apparatus comprising a sealed cylindrical container, a rotary disc placed horizontally and having a frame-like side wall projecting upward in the cylindrical container and a means for blowing air from the clearance between the container and the rotary disc; and supplying the granules onto the rotating rotary disc and shaping the granules into spheres.

It is preferable that the through holes of the hemispherical die have a diameter of 0.3 mm or less.

Another method of producing a cathode mixture in the present invention comprises the steps of:

kneading a cathode mixture, a conductive material, both in a powder state, and a binding agent instantaneously and uniformly by the rotation of a cylindrical member equipped with stirring blades; and making the kneaded mixture pass through the clearance between the rotating cylindrical member and the container so as to form granules continuously and instantaneously by using friction generated at the time of passing.

According to this method, the spherical granules having smaller diameters and smaller unevenness in diameter than the granules produced by the conventional method of using the batch-type kneading granulator. Therefore, granules having diameters in the range of 40 to 500 $\mu$m suited for cathode mixtures for batteries can be produced instantaneously in a high yield. Furthermore, since the granules of the cathode mixture produced by this method are obtained by instantaneous kneading and granulation, they are softer and more porous than the granules of the cathode mixture produced by the conventional method. Therefore, the cathode mixture is superior in absorption of an electrolyte. Consequently, it is possible to obtain batteries being superior in discharge performance even at a high load.

It is preferable that the width of the clearance between the outer side surface of the cylindrical member and the inner side surface of the container is 3.5 mm or less in order that the granules can have diameters in the range of 40 to 500 $\mu$m, suited for cathode mixtures for batteries. However, the clearance should preferably be 1 mm or more in consideration of the eccentricity of the cylindrical member and the container and the machining accuracy of the apparatus.

The height of the cylindrical member also exerts a significant influence on the diameters of the granules of the cathode mixture. It is preferable that the height is in the range of 30 to 200 mm, although the height also depends on the rotation speed of the cylindrical member.

In still another method of producing a cathode mixture in the present invention, a mixture containing an active material in a powder state and a binding agent is supplied to the upper surface of a rotary disc equipped with stirring blades. The mixture is then kneaded instantaneously and uniformly on the disc so as to produce a granular cathode mixture. The disc is disposed in a sealed container with its center axis used as a rotation shaft placed vertically. Dry hot air flows upward through the clearance between the outer side surface of the disc and the inner side surface of the container. The cathode mixture in a powder state and the binding agent supplied onto to the rotary disc are mobilized by the rotation of the stirring blades and the hot air flow, stirred together with the binding agent and shaped into spherical granules. Thus obtained granules of the cathode mixture can be measured accurately with a small unevenness in weight by leveling off. In addition, according to this method, since it becomes possible to omit the following drying step, the granules of the cathode mixture can be obtained in a short period of time.

Furthermore, the granules produced by this method can have smaller diameters and smaller unevenness in diameter than the granules produced by the conventional method. In particular, granules having diameters in the range of 40 to 500 $\mu$m, suited for cathode mixtures for batteries, can be produced instantaneously in a high yield. Moreover, according to this method, the granules of the cathode mixture are obtained by instantaneous kneading and granulation, therefore, the granules are softer and more porous in comparison with the one obtained by the conventional method, thereby being superior in absorption of an electrolyte. As a result, it becomes possible to obtain batteries being superior in discharge performance even at a high load.

Still another method of producing a cathode mixture in the present invention comprises the step of:

discharging a liquid mixture of a cathode active material, a binding agent and a conductive material together with hot air flow from nozzles formed on the side surface of a rotary disc disposed inside and at the upper portion of a truncated cone-shaped container with its narrower side directed downward.

The mixture is dried by the hot air flow and rolls on the inclined surface of the container while swirling and is granulated spherically. After the granulation, the obtained granules are collected. According to this method, it is possible to produce the granules which can be measured more accurately with a small unevenness in weight by leveling off, also have diameters in the range of 40 to 500 $\mu$m and is superior in a discharge characteristic even at a high load in a high yield. It is preferable that the diameter of the ports used to discharge the liquid mixture is in the range of 60 to 900 $\mu$m. This method of producing a cathode mixture by using the rotating nozzle can provide granules of a cathode mixture having small unevenness in weight measured by leveling off, being porous and superior in liquid absorption. The use of the cathode mixture can offer batteries having small unevenness in properties among several batteries and being superior in a discharge characteristic.

In the methods of producing a cathode mixture in the present invention, metal oxide such as manganese dioxide, copper oxide or silver chromate, metal sulfide, metal halide or carbon halide such as carbon fluoride can be used as the main active material.

Furthermore, the present invention can also be applied adequately to cathode mixtures for organic electrolyte batteries, alkaline electrolyte batteries and Leclanche batteries.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The examples of the present invention are explained below with reference to the drawings.

EXAMPLE 1

First, 5 kg of manganese dioxide as a cathode active material, 300 g of an expanded graphite as a conductive material, 50 g of tetrafluoroethylene-hexafluoropropylene copolymer as a binding agent and 1 kg of water were mixed for two minutes so as to obtain a mixture. Herein, the expanded graphite used in the mixture was obtained by intercalating sulfuric acid in the spaces among layers of a scaly graphite, heating the graphite so as to cause expansion among the layers and then removing compounds generated among the layers by washing, thereby increasing the specific surface area of the graphite.

Figure 1:
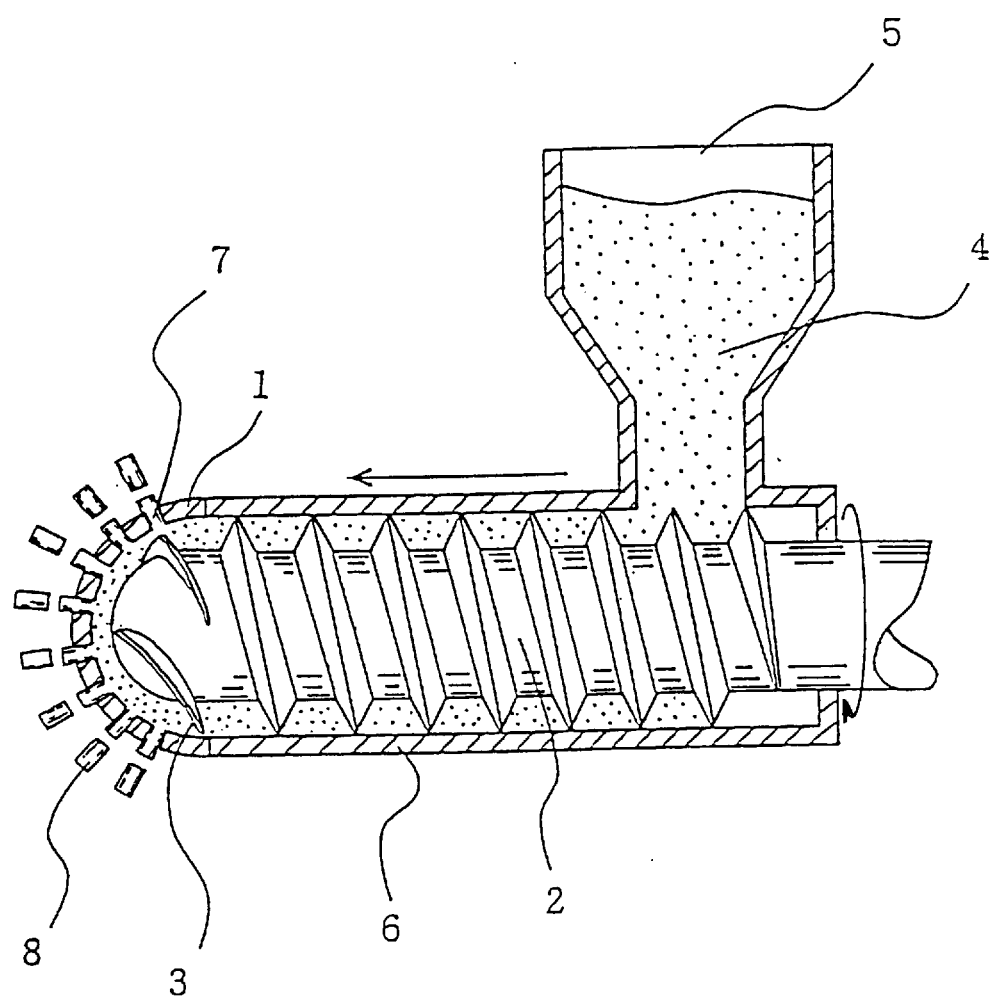
FIG. 1 is a vertical sectional view showing the granulating process of a granulator used in an example of the present invention.

This mixture was processed by a screw-inline type granulator shown in FIG. 1 to obtain cylindrical granules as described below. A mixture 4 obtained above was supplied to the granulator from a hopper 5. An extruding screw 2 disposed in a cylinder 6 rotates at a desired speed in the direction indicated in the figure by a motor (not shown) connected thereto. By the rotation of the extruding screw 2, the mixture 4 is extruded in the direction indicated in the figure while being kneaded. A hemispheric die 1 having a plurality of circular through holes 7 is secured at the tip of the cylinder 6. The mixture 4 having been extruded to the hemispheric die 1 by the extruding screw 2 is further extruded from the through holes 7 to the outside of the granulator. According to this method, the mixture 4 is sheared when the mixture 4 passes extruding vanes 3 secured at the tip of the extruding screw 2, and is torn by its own weight after being discharged from the hemispheric die 1, thereby obtaining cylindrical granules 8 having a length within a predetermined range. The hemispheric die 1 was implemented by a stainless steel screen and the through holes 7 had a diameter of 0.3 mm. The extruding screw 2 was rotated at 30 rpm.

Figure 2:
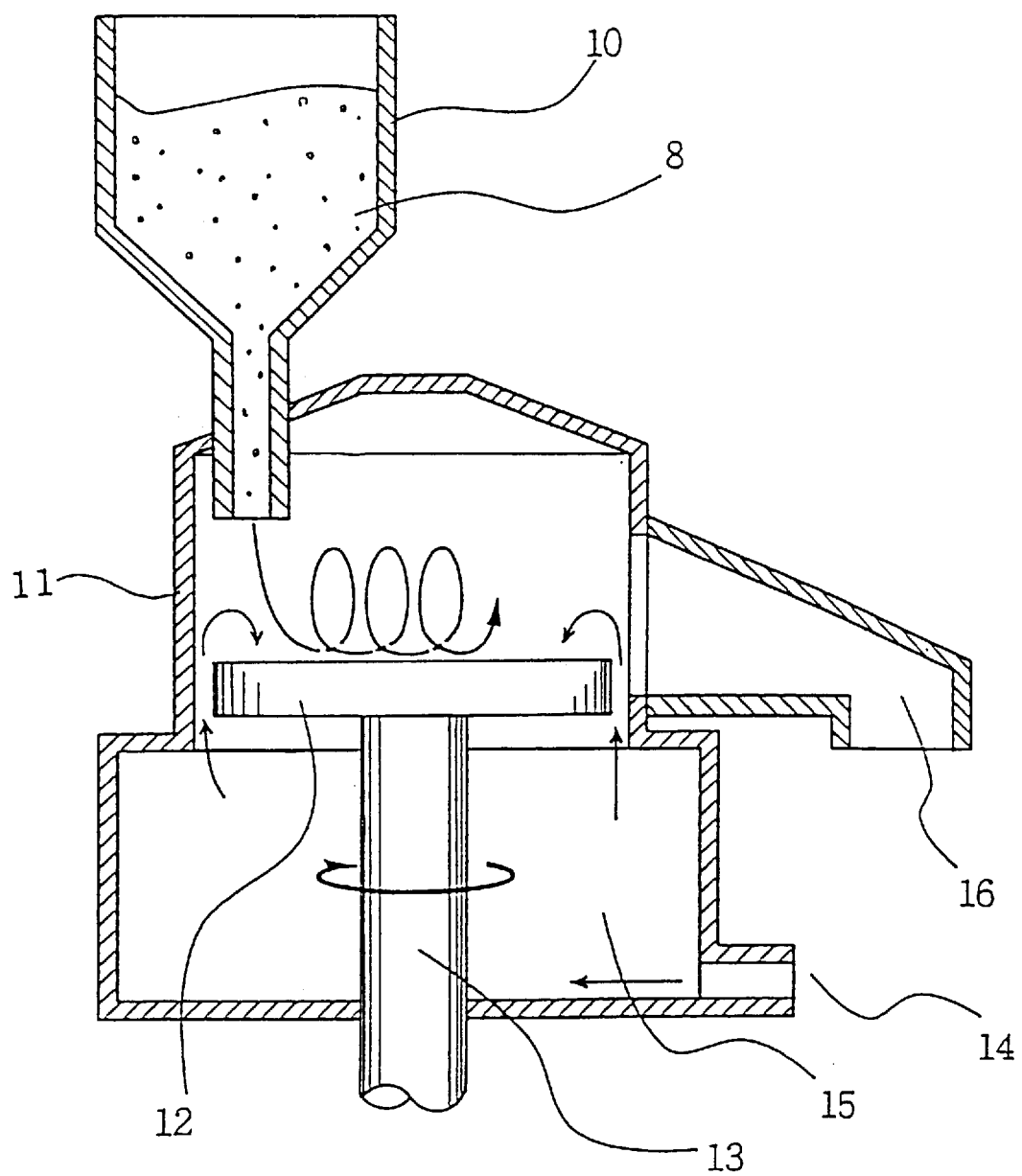
FIG. 2 is a vertical sectional view showing the granule shaping process of a granule shaping apparatus in the same example.

The cylindrical granules 8 thus obtained were supplied into a granule shaping apparatus shown in FIG. 2, while the granules remained wet. The cylindrical granules 8 which have been supplied from a hopper 10 is conducted onto a disc 12 which is disposed in a cylindrical container 12 with the surface of the disc 12 placed horizontally. A continuous upright side wall is formed at the outer peripheral portion of the upper surface of the disc 12. The disc 12 is rotated by a motor (not shown) connected to a rotation shaft 13. While air was blown into an air chamber 15 from an air blowing hole 14, the cylindrical granules 8 were supplied on the disc 12 rotating at 300 rpm. Then the supplied cylindrical granules 8 are rotated on the disc 12 and shaped into spheres.

Figure 3A:
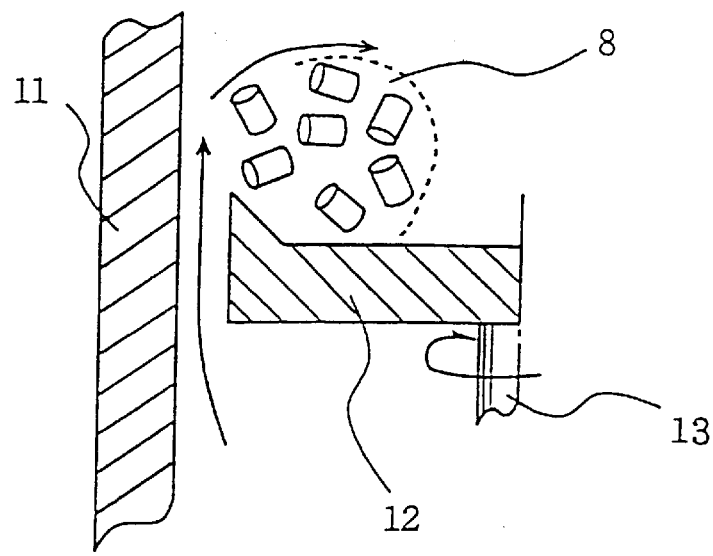
FIG. 3A is a magnified vertical sectional view showing the granule shaping process of the same granule shaping apparatus.
Figure 3B:
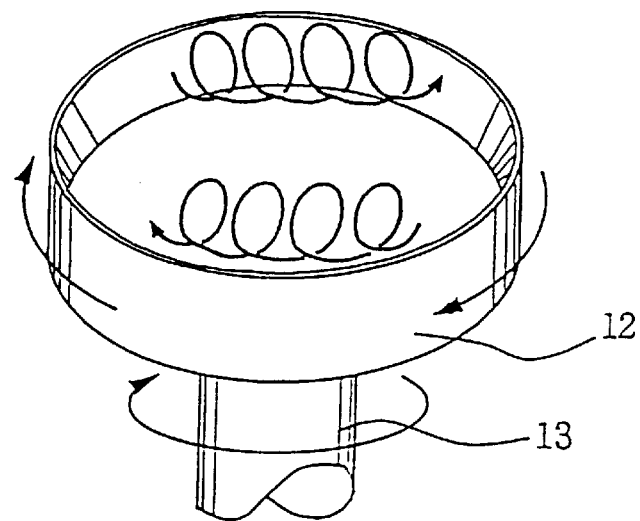
FIG. 3B is a magnified perspective view showing the granule shaping process of the same granule shaping apparatus.

As shown in FIGS. 3A and 3B, the cylindrical granules 8 supplied from the hopper 10 into the granule shaping apparatus fall to the rotating disc 12. After the fall, the cylindrical granules 8 are rotated while taking doughnut-like paths, as if ropes are twisted, along the side wall of the cylindrical container 11. This rotation is caused by the centrifugal force due to the rotation of the disc 12 and by the air blown from the clearance between the outer peripheral portion of the disc 12 and the cylindrical container 11. By this operation, the cylindrical granules are shaped into spheres. Herein, the air blown from the clearance between the disc 12 and the cylindrical container 11 is useful for preventing the cylindrical granules 8 from dropping and attaching to the rotation shaft 13. Shaped granules (not shown) thus obtained are discharged from a discharge dumper 16.

The shaped granules thus obtained were dried by hot air at 120° C., thereby obtaining a cathode mixture.

Comparative Example 1

As a comparative example, a mixture having the same mixture ratio as that of the above-mentioned Example 1 was kneaded for 15 minutes by a kneading apparatus provided with stirring vanes, and dried at 150° C. for 16 hours, thereby obtaining a cathode mixture.

These cathode mixtures of Example 1 and Comparative Example 1 were each measured 1,000 times by leveling off so as to obtain an amount of 450 mg, and unevenness in weight was examined. TABLE 1 shows the results of the examination.

TABLE 1

| cathode mixture | average [mg] | maximum [mg] | minimum [mg] | standard deviation (σ) [mg] |
| --- | --- | --- | --- | --- |
| Example 1 | 430.0 | 434.0 | 427.5 | 1.1 |
| Comparative Example 1 | 430.5 | 440.5 | 420.2 | 3.5 |

As clearly shown in TABLE 1, the unevenness in weight in the case of the cathode mixture of Example 1 is small, namely about ⅓ to the unevenness in the case of the cathode mixture of Comparative Example 1. It is apparent that the shaped granules of Example 1 are more uniform than those of Comparative Example 1.

Figure 4:
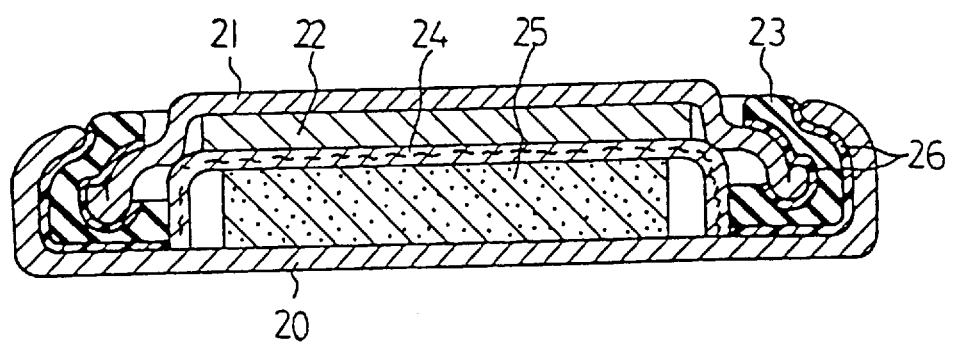
FIG. 4 is a vertical sectional view showing a coin-shaped lithium battery used to evaluate a cathode mixture obtained in the example of the present invention.

The cathode mixtures measured as described above were pressurized at 2,000 to 4,000 kgf/cm$^2$ and dried by hot air at 250° C., thereby obtaining cathode pellets. These cathode pellets were then used to produce coin-type lithium batteries measuring 20 mm in diameter and 16 mm in height as shown in FIG. 4. In a stainless steel battery case 20 which is also used as an cathode terminal, a cathode pellet 25 is disposed and is closely contacted with the battery case 20. A separator 24 made of nonwoven fabric of polypropylene impregnated with a nonaqueous electrolyte and an anode active material 22 of lithium are stacked in this order on the cathode pellet 25. At the opening of the battery case 20, a stainless steel sealing plate 21 also used as an anode terminal is disposed with a polypropylene gasket 23 intervened between the peripheral portion of the sealing plate 21 and the battery case 20. The sealing plate 21 compressed and adhered to the anode active material 22. The battery is hermetically sealed by applying sealing agent 26 to the surface of the gasket 23, and crimping the opening tip of the battery case 20 inward.

Figure 5:
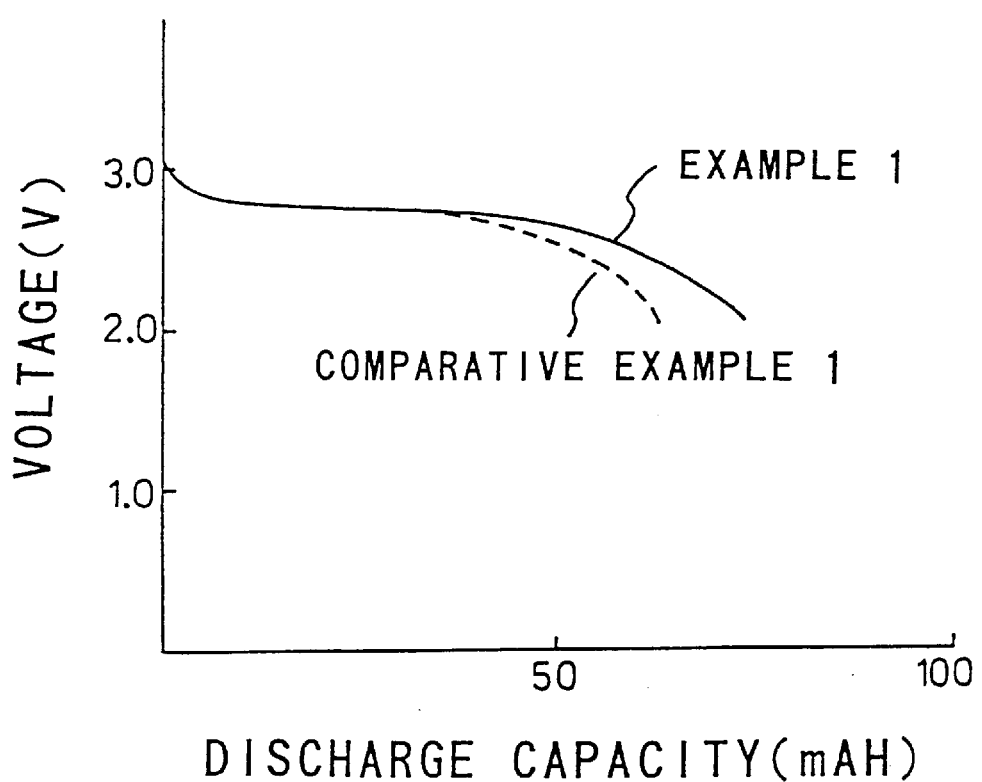
FIG. 5 is a characteristic diagram showing a high-load continuous discharge characteristic of the same battery.
Figure 6:
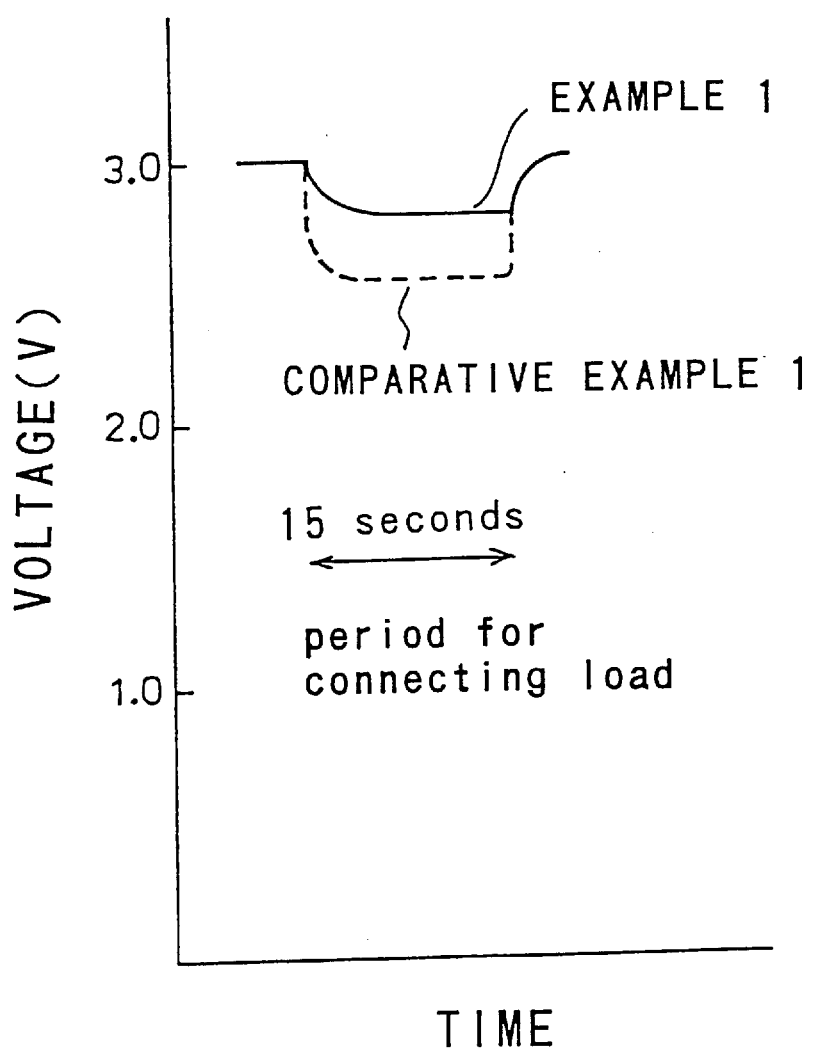
FIG. 6 is a characteristic diagram shown a closed-circuit voltage characteristic of the same battery.

The coin-type batteries using the cathode mixtures of Example 1 and Comparative Example 1 were subjected to a high-load continuous discharge characteristic test at an ambient temperature of 20° C. and at a load of 1 kΩ. FIG. 5 shows the results of the test. Furthermore, the batteries were also subjected to a high-load continuous discharge characteristic test wherein the batteries were connected to a load of 400Ω at an ambient temperature of 20° C. and discharged for 15 seconds. FIG. 6 shows the results of the test.

As shown in FIG. 5, it is confirmed that the battery using the cathode mixture of Example 1 is higher in the battery voltage and the discharge capacity than that of the conventional battery using the cathode mixture of Comparative Example 1. As shown in FIG. 6, the voltage drop in the close-circuit voltage characteristic of the battery using the cathode mixture of Example 1 is lower than that of the battery using the cathode mixture of Comparative Example 1. It is assumed that this is caused by the following reason. Since the battery using the cathode mixture of Example 1 has a larger specific surface area in the cathode mixture than the battery using the cathode mixture of Comparative Example 1, the reaction of the active material in the cathode takes place more easily in the battery using the cathode mixture of Example 1 than in the battery using the cathode mixture of Comparative Example 1.

The diameter of the through holes of the die is required to be 0.3 mm or less in order to obtain granules having diameters in the range of 40 to 500 μm, suited for cathode mixtures for batteries, in a high yield. However, since the die surface of a conventional extruding granulator is flat, the pressure applied to the die becomes nonuniform when the cathode mixture is extruded by a screw. Therefore, in case the diameter of the through holes is small, the die is apt to be heated and broken. For this reason, it is impossible to make the diameter of the through holes smaller than 0.5 mm. As a result, in the case that the conventional apparatus was used, the yield of the granules of the cathode mixture having a diameter in the above-mentioned range was low. Since the die of the present invention is hemispheric, it becomes possible to easily use the die provided with through holes having diameters in the range of 0.3 mm or less. Consequently, granules having diameters in the range of 40 to 500 μm can be produced in a high yield.

Furthermore, since the granules of the cathode mixture produced by the production method of the present example are softer and more porous than those produced by a conventional kneading granulator, the granules are superior in the absorption of an electrolyte. Accordingly, this makes it possible to obtain batteries superior in discharge performance even at a high load.

In the case of Example 1, a cathode mixture is made once in a cylindrical granular shape, and then the granules are shaped into spheres. However, in the case of the examples described below, a spherical granular cathode mixture is produced directly from a liquid mixture.

EXAMPLE 2

Figure 7:
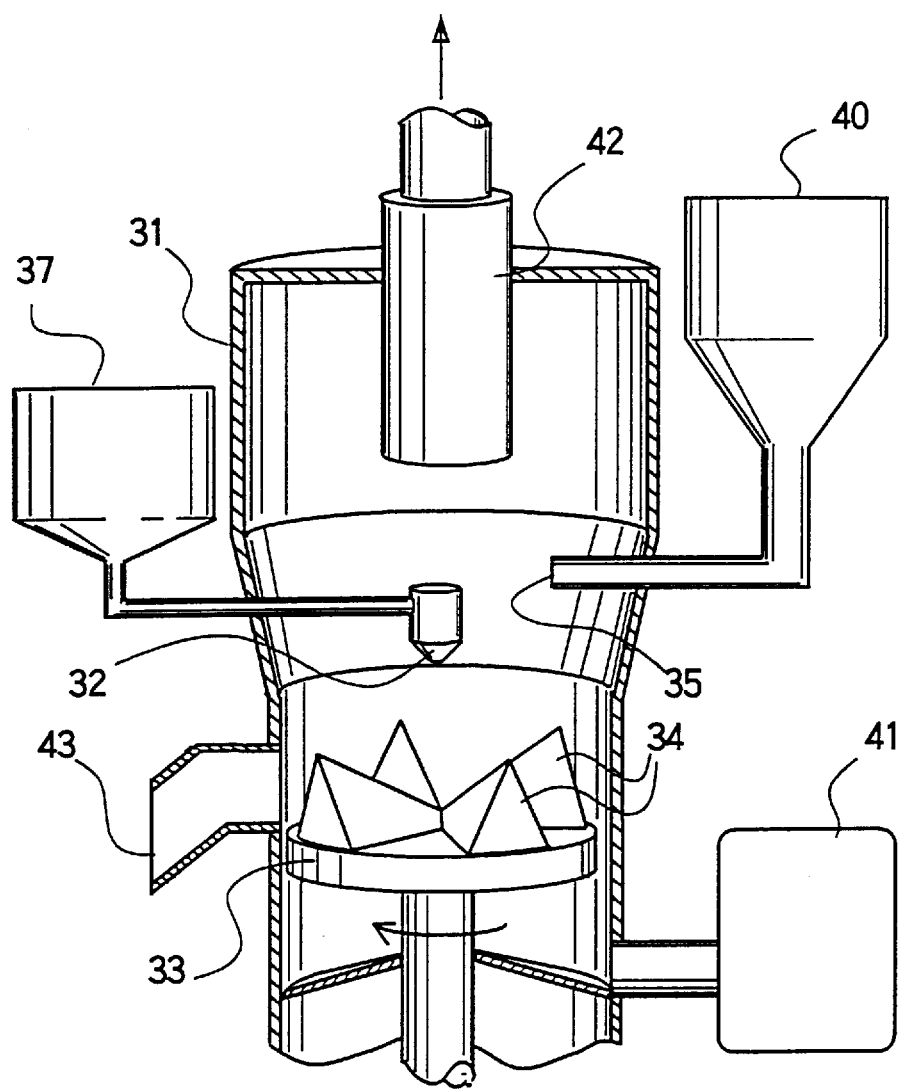
FIG. 7 is a partially cutaway front view showing a granulator used for another example of the present invention.

FIG. 7 shows a granulator used in this example. A nearly cylindrical container 31 is made of a stainless steel and its axis is disposed vertically. Inside the container 31, a disc 33, made of a stainless steel, is disposed with its center axis aligned with the center axis of the container 31. The disc 33 of 300 mm in diameter and 50 mm in height is rotated by a motor (not shown) connected downward thereto. On the upper surface of the disc 33, four triangular cone-shaped stirring blades 34 made of stainless steel and having a height of 40 mm are disposed at quarter sections from the center of the disc 33. The upper portion of the container 31 is provided with a supply port 35 extended from a material supply unit 40 and a spray nozzle 32 connected to a tank 37.

A cathode mixture was produced as described below by using this granulator. First, 5 kg of manganese dioxide and 300 g of an expanded graphite were mixed, and the mixture powder was supplied into the mixture powder supply unit 40. The mixture powder was continuously supplied from the supply port 35 to the upper surface of the disc 33 rotating at 5,000 rpm. An aqueous dispersion of polytetrafluoroethylene (hereinafter referred to as PTFE) as a binding agent was supplied into the tank 37. Simultaneously with the supply of the mixture powder, the dispersion was continuously sprayed from the spray nozzle 32 to the upper surface of the disc 33 in the proportions of 1 weight part PTFE to 100 weight parts manganese dioxide.

The supplied mixture powder and the binding agent are stirred and kneaded uniformly by the stirring blades 34 disposed on the upper surface of the rotating disc 33. The mixture is cast toward the inner side wall of the container 31 by the centrifugal force caused by the rotation of the disc 33. Dry hot air having a temperature of 120° C. is continuously blown upward from a hot air generator 41 through the clearance between the container 31 and the disc 33. Therefore, the mixture is thus blown upward by the air flow without dropping downward through the clearance. When the mixture falls on the disc 33, the mixture is stirred again. In this way, the mixture powder and the binding agent are mixed uniformly and shaped into spheres. Particles dispersed in the air flow are removed by suction through a bag filter 42. The cathode mixture thus produced is taken out from a discharge port 43.

In this method, it becomes possible to produce the spherical granules of the cathode mixture easily, by simply supplying the cathode active material and the conductive material onto the rotating disc respectively. Furthermore, there is no need for drying after shaping. Accordingly, it becomes possible to simplify the process of producing the cathode mixture.

EXAMPLE 3

Figure 8:
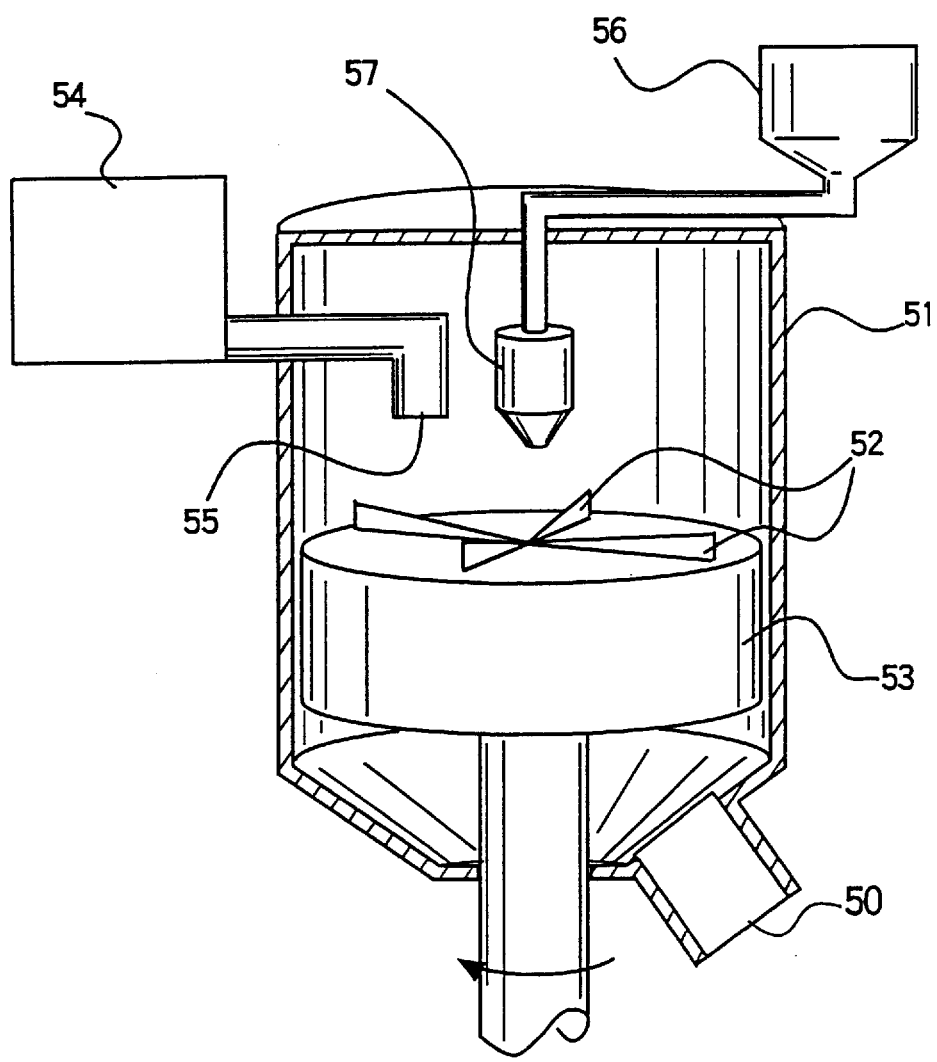
FIG. 8 is a partially cutaway front view showing a granulator used for still another example of the present invention.

FIG. 8 shows a granulator used for this example. A nearly cylindrical container 51 made of a stainless steel is disposed so as to make the center axis thereof vertical. Inside the container 51, a cylindrical member 53, also made of a stainless steel, is disposed with its center axis aligned with the center axis of the container 51 and with a clearance of 1 mm provided between the side wall of the cylindrical member 53 and the inner side wall of the container 51. The cylindrical member 53 is 300 mm in diameter and 50 mm in height. The cylindrical member 53 is rotated around its center axis by a motor (not shown) connected downward thereto. On the upper surface of the cylindrical member 53, four triangular stirring blades 52 made of stainless steel and having a height of 10 mm are disposed at quarter sections from the center of the cylindrical member 53. The upper portion of the container 51 is provided with a supply port 55 connected to a mixture powder supply unit 54 and a spray nozzle 57 connected to a tank 56.

A cathode mixture was produced as described below by using this granulator. Manganese dioxide as an active material and an expanded graphite as a conductive material were mixed at a weight ratio of 100:6, and then the mixture powder was supplied into the mixture powder supply unit 54. The mixture powder was continuously supplied from the supply port 55 to the upper surface of the cylindrical member 53 rotating at 5,000 rpm. At the same time, the aqueous dispersion of PTFE as a binding agent supplied into the tank 56 was continuously sprayed from the spray nozzle 57 to the upper surface of the cylindrical member 53 in the proportions of 1 weight part PTFE to 100 weight parts manganese dioxide. As a result, the mixture powder and the binding agent supplied to the upper surface of the cylindrical member 53 are stirred and kneaded uniformly by the stirring blades 52. Furthermore, the mixture is thrown outward by the centrifugal force caused by the rotation of the cylindrical member 53. The mixture cast outward enters the clearance between the inner side surface of the container 51 and the outer side surface of the cylindrical member 53. While passing through the clearance, the mixture is instantaneously shaped into spheres because of the contact to the stationary container 51 and the rotating cylindrical member 53. The cathode mixture thus obtained is discharged from a discharge port 50.

In this method, it is possible to obtain spherical cathode mixture by simply supplying the cathode active material and the conductive agent onto the rotating disc and there is no need for granulating the cathode mixture previously as same as Example 2. Although additive step of drying is required after granulating, it is possible to subject all steps including drying continuously and there is no need for treating one by one batch as same as in the Examples 1 and 2. Therefore, this method is excellent in productivity.

EXAMPLE 4

In the above Examples 1–3, the method of producing the spherical cathode mixture by supplying the materials of the cathode mixture onto the rotating disc or plates. Contrary to these examples, the same cathode mixture is produced by supplying the cathode mixture material from a rotating nozzle in this example.

Figure 9:
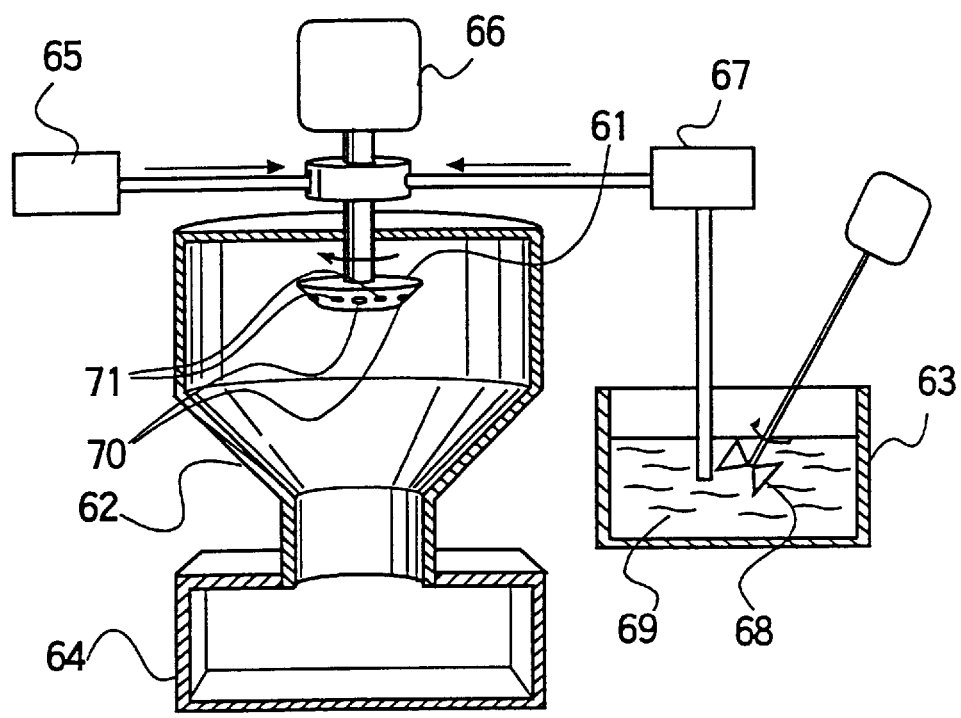
FIG. 9 is a partially cutaway front view showing a granulator used for yet still another example of the present invention.

A cathode mixture was produced as described below by using a granulator shown in FIG. 9. A nearly truncated circular cone-shaped container 62 is disposed with its narrower side placed downward and with its central axis directed vertically. The wider side of the container 62 has a diameter of 1,000 mm. At the upper portion of the container 62, a truncated circular cone-shaped disc 61 of 100 mm in diameter on the wider side and 30 mm in thickness is disposed with its center axis, which is used as a rotation shaft, directed vertically. The disc 61 is provided with eight discharge ports 70 and eight hot air blowing ports 71. The discharge port 70 and the hot air blowing port 71 are provided alternatively in a single row around the peripheral side surface of the disc 61. The discharge ports 70 are connected to a material tank 63, and the hot air blowing ports 71 are connected to a hot air generator 65. Additionally, a collection tank 64 is disposed at the lower portion of the container 62.

A liquid mixture agent 69 discharged from the discharge ports 70 collides with the inner side surface of the container 62 while being dried by hot air. However, since the liquid mixture agent 69 has a velocity component in the tangential direction of the disc 61 because of the rotation of the disc 61, the incident angle of the agent is acute when the liquid mixture agent 69 collides with the inner side surface of the container 62. Therefore, while being dried, the liquid mixture agent 69 rolls with swirling around the center axis of the container 62 on the inclined side surface of the container 62. In this way, the cathode mixture is shaped into spheres and collected by the collection tank 64.

A cathode mixture was produced as described below. First, 5 kg of manganese dioxide, 300 g of an expanded graphite, 50 g of PTFE as a binding agent and 5 kg of water were supplied into the material tank 63. A stirring impeller 68 was disposed in the material tank 63 to uniformly stir the liquid mixture agent 69 and to prevent the liquid mixture agent 69 from settling. The impeller 68 was rotated at 30 rpm. Next, a pump 67 was operated to supply the liquid mixture agent 69 to the rotating disc 61, and the agent was then discharged from the discharge ports 70 disposed on the side surface of the disc 61. At the same time, dry air heated at 120° C. was supplied from the hot air generator 65 to the disc 61 so as to blow hot air from the hot air blowing ports 71 disposed on the side surface of the disc 61. At this time, however, the disc 61 was rotated at 5,000 rpm by a motor 66.

In the case of the above-mentioned example, the liquid mixture agent discharge ports and the hot air blowing ports were disposed in a single row around the periphery of the disc. However, these two types of ports may be disposed in different rows. Furthermore, each type of ports may be formed in a plurality of rows.

The diameter of the obtained granules can be controlled depending on the diameter of the liquid mixture agent discharge ports, the concentration of the liquid mixture agent and the like. In order to obtain granules having diameters in the range of 40 to 500 $\mu$m, the diameter of the liquid mixture agent discharge ports should be in the range of 60 to 900 $\mu$m.

Comparative Example 2

By using the batch-type kneading apparatus of a conventional method, manganese dioxide, an expanded graphite and an aqueous dispersion of PTFE were mixed in the weight ratio of 100:6:1 in the same way as the above-mentioned example and stirred for 15 minutes. This mixture was dried at 120° C. for 16 hours to obtain a cathode mixture as Comparative Example 2.

The cathode mixtures of Examples 2 to 4 and Comparative Example 2 obtained as described above were each measured by a leveling-off so as to obtain an amount of 450 mg.

The measured cathode mixtures were pressurized at 2,000 to 4,000 kgf/cm$^2$ so as to be shaped into pellets, and dried again by hot air at 250° C. to obtain cathode pellets.

These cathode mixtures were each measured 10,000 times so as to obtain an amount of 450 mg by leveling off, and the unevenness in weight was examined. TABLE 2 shows the results of the examination.

TABLE 2

| CATHODE MIXTURE | Average [mg] | Maximum [mg] | Minimum [mg] | Standard Deviation (σ) [mg] |
| --- | --- | --- | --- | --- |
| Example 2 | 430.0 | 434.4 | 427.4 | 1.1 |
| Example 3 | 430.0 | 434.3 | 426.9 | 1.2 |
| Example 4 | 430.0 | 433.5 | 428.4 | 0.9 |
| Comparative Example 2 | 430.7 | 441.2 | 419.8 | 3.6 |

As clearly shown in TABLE 2, the unevenness in the weight values of the cathode mixtures of Examples 2 to 4 measured by leveling off is smaller than that of the cathode mixture of Comparative Example 2. This is because the cathode mixtures of Examples 2 to 4 have small unevenness in diameter and are spherical in shape.

Figure 10:
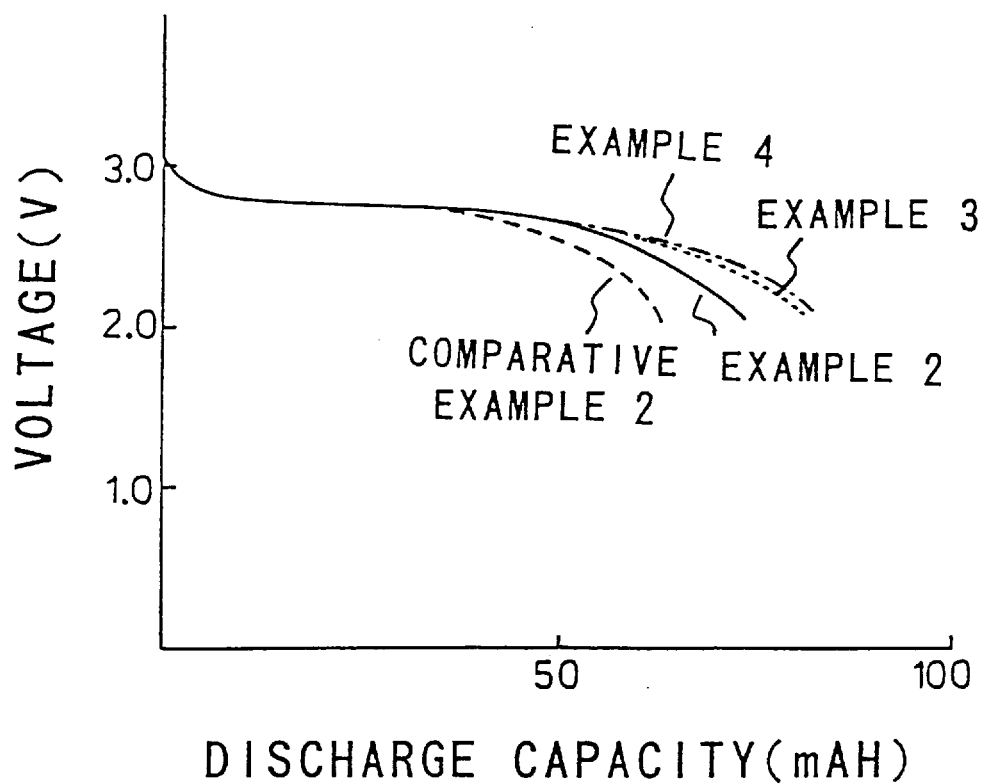
FIG. 10 is a characteristic diagram showing a high-load continuous discharge characteristic of the battery.
Figure 11:
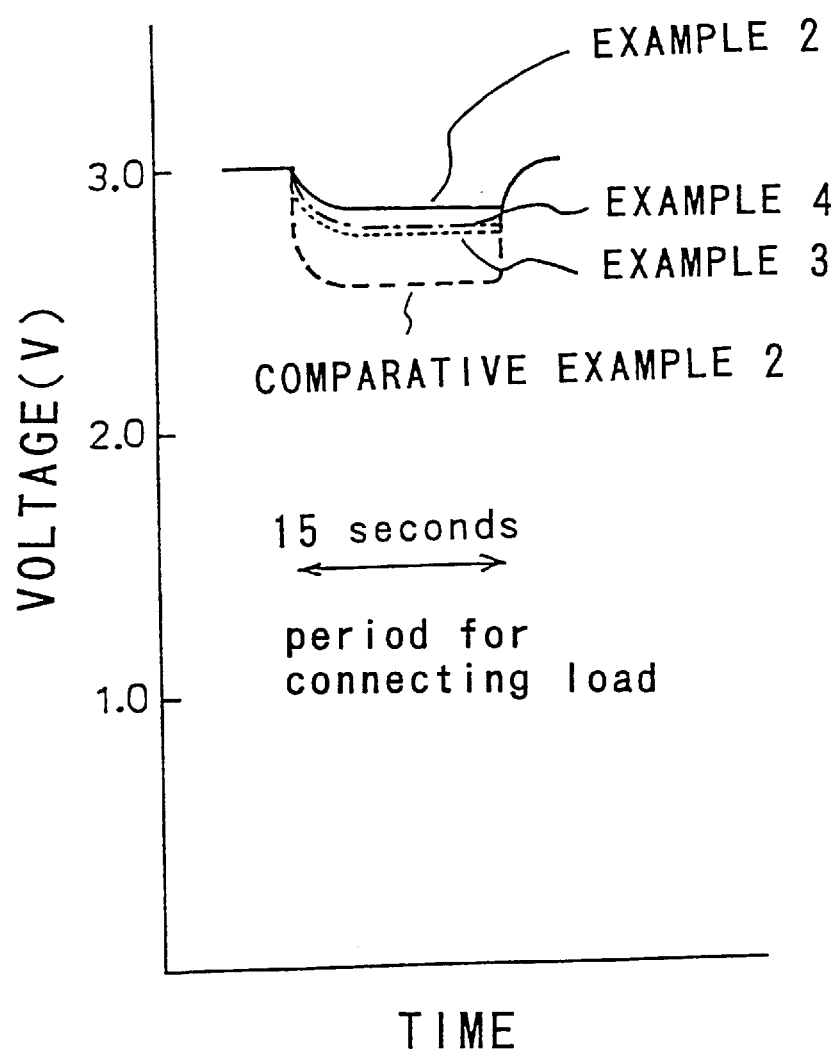
FIG. 11 is a characteristic diagram shown a closed-circuit voltage characteristic of the battery.

Next, coin-type lithium batteries, which are similar to the battery using the cathode mixture of Example 1, were produced by using the cathode mixtures of Example 2 to 4 and Comparative Example 2, and they were evaluated in performance. As shown in FIG. 10 and FIG. 11, respectively, it was confirmed that the batteries using the cathode mixtures of Examples 2 to 4 were superior in the high-were superior discharge characteristic and the closed-circuit voltage characteristic just as in the case of Example 1. It is assumed that this is caused by the following reason. Since the porosities of the cathode mixtures of Examples 2 to 4 are higher than that of the cathode mixture of Comparative Example 2, the reaction of the active materials in the cathode of the batteries using the cathode mixture of Example 2 to 4 takes place more easily than in the cathode of the battery made by using the cathode mixture of Comparative Example 2.

Since the unevenness in granule size of the cathode mixtures of Examples 2 to 4 is small as described above, the cathode mixtures can be measured accurately with small unevenness in weight by leveling off. In addition, since the cathode mixture can have high porosities and large specific surface areas, it is possible to obtain batteries having a high discharge characteristic even at a high load. In particular, since the cathode mixtures of Examples 3 and 4 are soft and porous and have large specific surface areas, these cathode mixtures can be used to obtain batteries having a high discharge characteristic even at a high load.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A method of producing a cathode mixture for batteries comprising the steps of:

supplying a wet mixture containing a cathode active material, a binding agent and a conductive material into a screw inline granulator comprising a cylinder, an extruding screw disposed in said cylinder and a hemispherical die having through holes at the tip surface of said cylinder so as to produce granules by extruding said mixture from said through holes by the rotation of said extruding screw;

preparing a granule shaping apparatus comprising a sealed cylindrical container, a rotary disc placed horizontally and having a frame-like side wall projecting upward in said cylindrical container and a means for blowing air from the clearance between said container and said rotary disc; and supplying said granules onto said rotary disc, to shape said granules into spheres.

2. A method of producing a cathode mixture for batteries in accordance with claim 1, wherein the diameter of said through hole is 0.3 mm or less.

3. A method of producing a cathode mixture for batteries by using a granulator comprising a nearly cylindrical container having a center axis disposed vertically, and a cylindrical member disposed in said container with the center axis thereof used as a rotation shaft and aligned with the center axis of said container and equipped with stirring blades projecting upward on the upper surface of said cylindrical member, comprising the steps of:

supplying a cathode active material and a conductive material both in a powder state and at the same time spraying a binding agent in a liquid state to the upper surface of said cylindrical member which rotates, to knead said cathode active material, conductive material and binding agent by a rotation of said stirring blades; and shaping the kneaded mixture step into spheres by passing said mixture through the clearance between the outer side surface of said cylindrical member and the inner side surface of said container.

4. A method of producing a cathode mixture for batteries in accordance with claim 3, wherein the width of said clearance between the outer side surface of said cylindrical member and the inner side surface of said container is in the range of 1.0 to 3.5 mm.

5. A method of producing a cathode mixture for batteries in accordance with claim 3, wherein the height of said cylindrical member is in the range of 30 to 200 mm.

6. A method of producing a cathode mixture for batteries comparing the steps of:

preparing an apparatus comprising a nearly cylindrical container having a center axis placed vertically, a disc disposed in said container with the center axis thereof used as a rotation shaft aligned with the center axis of said container and equipped with stirring blades projecting upward, and a drying means for blowing hot air upward through the clearance between the inner side surface of said container and the outer side surface of said disc; and supplying a cathode active material and a conductive material, both in a powder state, onto said disc while said disc is rotated and hot air is blown upward through the clearance between the outer side surface of said disc and the inner side surface of said container, and at the same time spraying a liquid binding agent onto said disc, to knead and shape said cathode active material, said conductive material and said binding agent and obtain spherical granules.

7. A method of producing a cathode mixture for batteries comprising the steps of:

preparing a granulator comprising a nearly truncated circular cone-shaped container having a center axis placed vertically and a nozzle portion secured to a rotation shaft aligned with the center axis of said container, extended in a direction having a horizontal component and having liquid mixture agent discharge ports and hot air blowing ports; and discharging a liquid mixture containing a cathode active material, a binding agent and a conductive material from said liquid mixture agent discharge ports into said container, and blowing hot air from said hot air blowing ports so as to roll said discharged mixture along the inclined side surface of said container while drying and shaping said mixture into spherical granules.

8. A method of producing a cathode mixture for batteries in accordance with claim 7, wherein the diameter of said liquid mixture agent discharge port is in the range of 60 to 900 $\mu$m.

9. A method of producing a cathode mixture for batteries in accordance with claim 1, wherein said cathode active material is at least one kind of substance selected from the group consisting of metal oxide, metal sulfide, metal halide and carbon halide.

10. A method of producing a cathode mixture for batteries in accordance with claim 3, wherein said cathode active material is at least one kind of substance selected from the group consisting of metal oxide, metal sulfide, metal halide and carbon halide.

11. A method of producing a cathode mixture for batteries in accordance with claim 6, wherein said cathode active material is at least one kind of substance selected from the group consisting of metal oxide, metal sulfide, metal halide and carbon halide.

12. A method of producing a cathode mixture for batteries in accordance with claim 7, wherein said cathode active material is at least one kind of substance selected from the group consisting of metal oxide, metal sulfide, metal halide and carbon halide.

* * * * *